United States Patent [19]
Faulkenberry

[11] Patent Number: 6,033,310
[45] Date of Patent: Mar. 7, 2000

[54] VARIABLE LENGTH DRIVE SHAFT

[75] Inventor: Michael E. Faulkenberry, Greenville, S.C.

[73] Assignee: The Cline Company, Greenville, S.C.

[21] Appl. No.: 09/063,265

[22] Filed: Apr. 20, 1998

[51] Int. Cl.[7] ..................................... F16C 3/03
[52] U.S. Cl. ........................ 464/26; 464/162; 403/307; 72/249
[58] Field of Search .............................. 464/26, 113, 162, 464/179, 183; 403/299, 307, 311; 72/249

[56] References Cited

U.S. PATENT DOCUMENTS

| | | | |
|---|---|---|---|
| 2,360,962 | 10/1944 | Megathlin | 464/113 |
| 2,372,180 | 3/1945 | Edwards | 464/26 |
| 2,614,405 | 10/1952 | Clausen | 464/26 |
| 3,303,668 | 2/1967 | Winkler . | |
| 3,380,264 | 4/1968 | Moore . | |
| 4,003,219 | 1/1977 | Stull . | |
| 4,236,388 | 12/1980 | Geisthoff . | |
| 4,275,786 | 6/1981 | Lee | 403/31 |
| 4,427,398 | 1/1984 | Eisbrecher et al. | 464/26 |
| 4,944,711 | 7/1990 | Hironaka et al. . | |
| 4,945,745 | 8/1990 | Bathory et al. | 464/162 |
| 5,080,634 | 1/1992 | Makase | 464/169 |
| 5,195,930 | 3/1993 | Hirano et al. | 464/113 |
| 5,230,658 | 7/1993 | Burton | 464/162 |
| 5,716,276 | 2/1998 | Mangas et al. | 464/162 |

FOREIGN PATENT DOCUMENTS

| | | | |
|---|---|---|---|
| 2734380 | 11/1978 | Germany | 72/249 |

*Primary Examiner*—Eileen Dunn Lillis
*Attorney, Agent, or Firm*—Henry S. Jaudon; Cort Flint

[57] ABSTRACT

A variable length light weight drive shaft for a rolling mill roll including: a driven first end including a universal joint connecting with an end of a male splined shaft having an axial bore and counter bore and a driving second end including a universal joint connecting with a torque tube and a female spline shaft which engages over the male splined shaft for axial movement. A gas cylinder is mounted in the counter bore adjacent to the second end of the male splined shaft. A cylinder rod extends from the cylinder and is connected to with the universal joint at the driving end. The piston rod includes a self aligning coupler. The gas cylinder and cylinder rod exert continuous outward pressure against the driven and driving ends which maintains them in pressure contact with the driving and driven members while allowing axial movement of the drive shaft. The self-aligning coupler relieves stress on the drive shaft and particularly the cylinder rod by maintaining it axially aligned during movements of the drive shaft which are slightly off center.

19 Claims, 2 Drawing Sheets

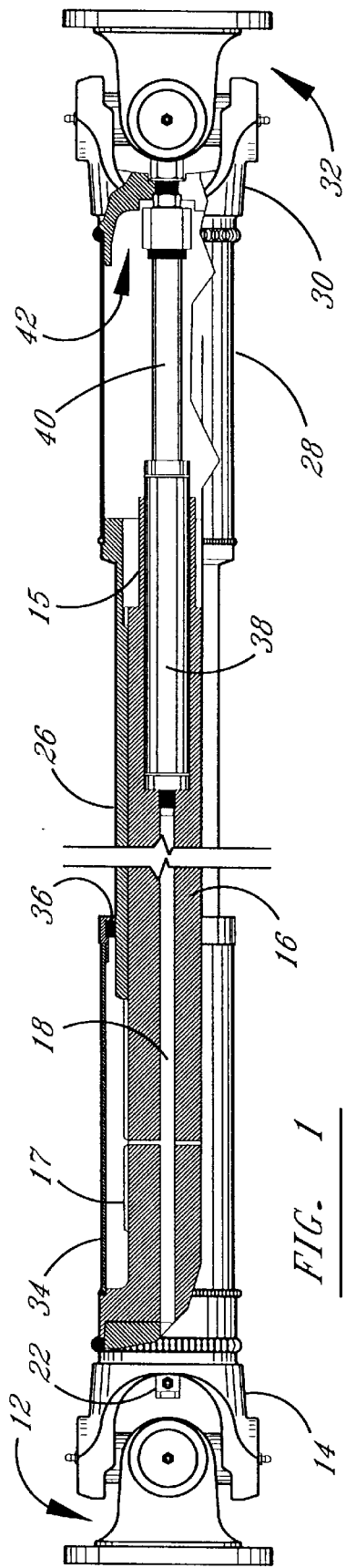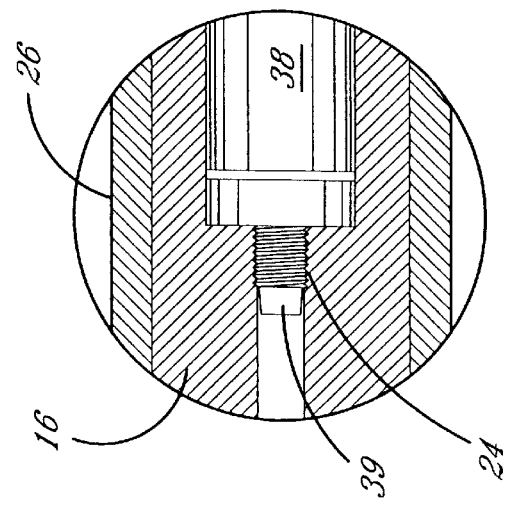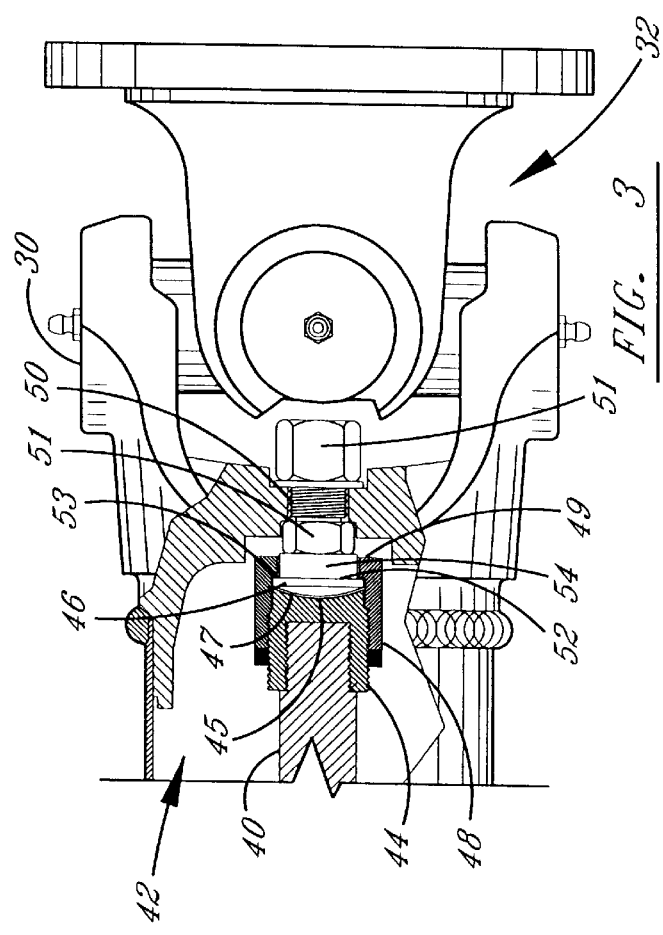

VARIABLE LENGTH DRIVE SHAFT

BACKGROUND OF THE INVENTION

The invention relates to an improve light weight axially retractable drive shaft for driving the rolls of a rolling mill.

In the past axially retractable drive shafts for use with rolling mills utilized coil springs which applied a continuous outward axial thrust while providing the capability of inward compressive axial movement. These drive shaft arrangements have the common draw back of excessive weight and bulk. The coil springs have a tendency to vibrate and generate excessive noise. The vibrations have a tendency to create unwanted stress and untimely breakdowns.

It is a primary object of the instant invention to overcome these drawbacks by providing a drive shaft which is light weight and durable.

Another object of the invention is to provide an axially movable drive shaft which operates under continuous outward pressure.

Another object of the invention is an axially movable drive shaft with a light weight gas spring.

Another object of the invention is a light weight drive shaft capable of self alignment when in use.

Another object of the invention in a drive shaft which incorporates as a part of its structure a self-aligning coupler.

Another object of the invention is a drive shaft capable of continuously transmitting torque, adjusting its length and adjusting its axial thrust and alignment.

SUMMARY OF THE INVENTION

The instant invention is directed to a light weight drive shaft for driving a rolling mill roll weighing no more than approximately 109 kg. The drive shaft is formed with a first end connected with a drive unit and a second end connected with a driven roll. The drive shaft includes a pair of splined shafts interengaged for relative axial movement of at least 310 mm. The splined shafts are engaged in a fixed rotational relationship.

A gas cylinder and cylinder rod is fixed at opposed ends with the spline shafts. The gas cylinder and cylinder rod exert continuous outward axial pressure against the splined shafts while allowing limited inward axial movement. The pressure varies between 1325 N(newton) when the splined shafts are extended and 2370 when they are compressed. The gas cylinder is mounted in a counter bore formed in one of the splined shafts.

A self aligning coupler is connected with the gas cylinder and cylinder rod. The self-aligning coupler acts to maintain the cylinder rod axially aligned through slight mis-aligning movements of the drive shaft. The self-aligning coupler is in effect through about a 1/32" shift of the drive shaft.

The self aligning coupler connects with an end of the cylinder rod and with the driven end of the drive shaft. Its construction includes a concave and a convex surface which are located in a housing in an abutting relationship. The cylinder shaft extends through an opening in the housing and connects with one of the surfaces. The opening allows a slight lateral movement of the cylinder shaft.

DESCRIPTION OF THE DRAWINGS

FIG. 1 is a cut away side of the drive shaft of the invention;

FIG. 2 is an exploded sectional view of the connection of the air cylinder with the splined shaft;

FIG. 3 is a exploded sectional view of the driving end of the novel drive shaft;

DESCRIPTION OF A PREFERRED EMBODIMENT

Figure 4:
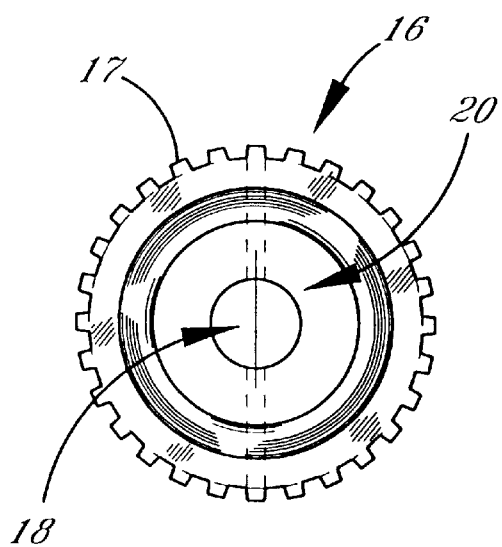
FIG. 4 is a sectional end view of the male splined shaft.

Referring now in more detail to the drawings, the invention will now be described in more detail.

A drive shaft according to the invention is shown at 10 in FIG. 1. Drive shaft 10 is a very large piece of equipment weighing approximately 109 kg primarily designed to connect with and drive the rolls of a rolling mill. As rolling mill rolls normally have some axial motion, it is necessary that drive shaft 10 also be capable of limited axial motion while delivering driving motion. Also, the drive shaft is subject to motion which causes it to vary slightly out of axial alignment during operation. A self-aligning coupler assist in this phenomena.

The drive shaft of the invention is not limited to use with rolling mills and may be utilized with others suitable systems.

Drive shaft 10 is formed with a universal coupling 12 at one end which engages with a drive system of any suitable type. Yoke 14, which forms a portion of universal joint 12, is connected with male splined shaft 16 formed with splines 17 about its periphery. Splined shaft 16 is formed with an axial bore 18 which merges with counter bore 20, along its length. A grease fitting 22 is connected with a first end of bore 18 while its opposite end, adjacent the merger with counter bore 20, is formed with a threaded section 24. Bore 18 serves as a grease passageway for lubricating splines 17.

Figure 5:
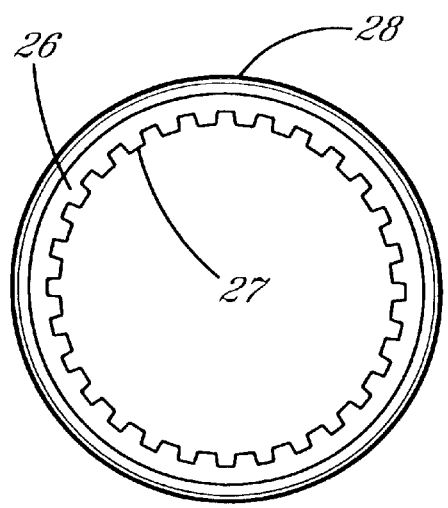
FIG. 5 is a sectional end view of the female splined shaft.

A female splined shaft 26 is positioned over an end of male spline shaft 16 with its splines 27 (FIG. 5) engaging between splines 17. Spline shafts 16 and 26 are adapted for relative axial movement while being fixed against relative rotable movement.

Mounted with spline shaft 26 is torque tube 28 which extends to and is connected with yoke 30 of universal joint 32 at the driving end of the drive shaft. Torque tube 28 forms a continuation of the hollow splined shaft 26 while reducing its overall weight.

Dust sleeve 34 is mounted with spline shaft 16 adjacent yoke 14 and is arranged to extend over splines 17. The opposite end of sleeve 34 engages over splined shaft 26 with a seal 36. Sleeve 34 protects the splines of spline shaft 16 from dust and other contaminants while allowing relative axial movement between splined shafts 16 and 26.

A gas spring, consisting gas cylinder 38 and cylinder rod 40, is provided to exert continuous axial pressure against the opposing ends of drive shaft 10. Cylinder 38, which has a threaded extension 39 at its closed end, is mounted in counter bore 20 with extension 39 screwed into threaded section 24, locking the cylinder in position within counter bore 20 and sealing bore 18. The end of shaft 16 may be necked down as indicated at 15 to further reduce the weight of the drive shaft.

Cylinder rod 40 extends from cylinder 38 and is engaged with yoke 30 by way of self-aligning coupler 42 and bolts 51.

Coupler 42 comprises a cap 44 threaded onto the end of cylinder rod 40. The outer end of cap 44 comprises a concave engagement face 45. Jam 46, which is secured with yoke 30 by bolts 51 and threaded extension 50 is formed with convex face 47. Concave face 45 is adapted to be received in convex face 47. Housing 48 is threaded onto cap 44 and positioned to engage over concave face 45 and convex face 47. The housing 48 acts to retain faces 45, 47 in contact in substantially the relative positions shown in FIG. 3. Circular opening 49, formed in the end of housing 48, receives a circular extension 54 of jam 46 which forms with extension 50. Extension 50 passes through opening 49 to secure with yoke 30. Opening 49 is slightly larger than extension 50.

Jam 46 includes a collar 52 which engages with inner face 53 of housing 48. Collar 52 retains convex face 47 of jam 46 against axial movement and in contact with concave face 45 within housing 48. Opening 49, because it is slightly larger than circular extension 54, allows a slight lateral movement of threaded extension 50 of about 1/32" away from the axis of cylinder rod 40. This lateral movement allows cylinder rod 40, which is under axial pressure, to remain unbent or straight during movements of drive shaft 10 in which splined shafts 16 and 26 become slightly out of axial alignment while driving the rolls of a rolling mill.

Figure 6:
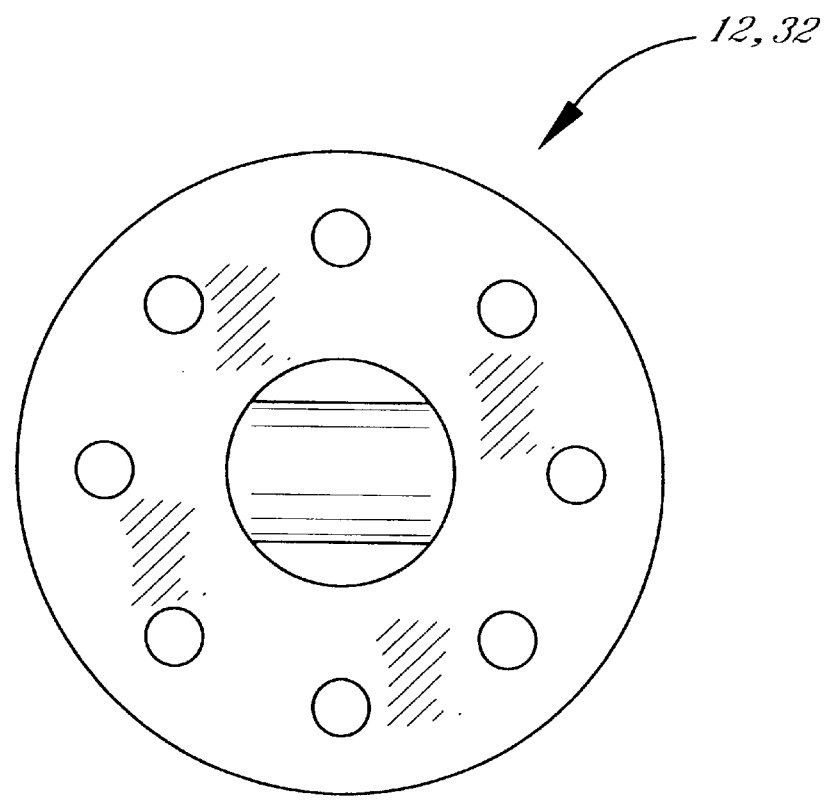
FIG. 6 is an end view of the drive shaft of the invention.

FIG. 6 shows the end structures of the drive shaft which are connected by suitable bolts with the drive source at universal 12 and with the driver roll at universal 32.

In operations, drive shaft 10 is compressed by mechanical means and positioned between and connector with a driving member via universal 12 and a driven roll of a rolling mill via universal 14. The mechanical compressing means are removed and gas cylinder 38 and cylinder rod 40 exert continuous outward axial pressure of between 1325 to 2370N against both the driving and driven members.

During operation, the distance between the driving and driven members has been found to vary slightly. The splined shafts 16 and 26 accommodate this action allowing axial movement of the drive shaft while the cylinder 38 and cylinder rod 40 maintain the necessary axial pressure against the driving and driven members. It has also been found that drive shaft 10, experiences slight movements out of axial alignment during operation. Ordinarily this would cause cylinder rod 40, which is under continuous axial pressure, to bend and possibly warp. Self-aligning coupler 42, by allowing lateral movement of extension 50 maintains cylinder rod 40 axially aligned and not subject to excessive stress.

While a preferred embodiment of the invention has been described using specific terms, such description is for illustrative purposes only, and it is to be understood that changes and variations may be made without departing from the spirit or scope of the following claims.

What is claimed is:

1. A variable length drive shaft for driving a rolling mill roll including:
   a first end connecting with a drive member delivering rotational motion;
   a second end connecting with and rotably driving one end of said mill roll;
   said first end including a first universal joint connecting with an end of a male splined shaft having an axial bore;
   said second end including a second universal joint connecting with a torque tube and a female spline shaft which engages over said male splined shaft for axial movement;
   a gas cylinder and cylinder rod, said gas cylinder being mounted with a second end of said male splined shaft with said cylinder rod extending from said gas cylinder and passing through said torque tube to connect with said second universal joint at said second end, said cylinder rod including a self aligning coupler; whereby,
   said gas cylinder and cylinder rod are maintained axially aligned while exerting continuous outward pressure against said first and second ends maintaining them in pressure contact with said drive member and said mill roll while said male and female spline shafts make slight movements out of axial alignment during driving motion.

2. The drive shaft of claim 1; including a dust sleeve encasing a portion of said made spline shaft and said female spline shaft.

3. The drive shaft of claim 2; wherein said dust sleeve is fixed at one end with said male spline shaft.

4. The drive shaft of claim 1; wherein said male splined shaft includes an axial counter bore extending from the second end thereof and merging with said axial bore.

5. The drive shaft of claim 4; wherein said gas cylinder is mounted in said counter bore.

6. The drive shaft of claim 5; including a threaded section formed in said axial bore adjacent said counter bore, said gas cylinder being threaded into with said threaded section, fixing said gas cylinder within said counter bore.

7. The drive shaft of claim 1; wherein said second end of said male splined shaft includes a necked down partition.

8. The drive shaft of claim 1; wherein said self aligning coupler includes a cap having a concave face secured in fixed position with cylinder rod and a jam having a convex face secured with said universal joint, said concave and convex faces being positioned in abutting relationship; and,
   a housing receiving and maintaining said convex and concave faces in abutting relationship.

9. The drive shaft of claim 8; wherein said housing allows limited lateral movement between said convex and concave faces.

10. A light weight drive shaft for driving a rolling mill roll including:
    a first end connected with a drive;
    a second end connected with said roll;
    a pair of splined shafts interengaged for relative axial movement and a fixed rotational relationship;
    a gas cylinder and cylinder rod fixed at opposed ends with said splined shafts, said gas cylinder and cylinder rod exerting continuous outward axial pressure against said splined shafts while allowing limited inward axial movement of said splined shafts; and,
    a self aligning coupler connected with said gas cylinder and cylinder rod, said self aligning coupler maintaining said cylinder rod axially aligned through slight misaligning movements of said drive shaft.

11. The drive shaft of claim 10; wherein said self-aligning coupler is effect through at least a 1/32" inch shift of said drive shaft.

12. The drive shaft of claim 10; wherein said pair of splined shafts includes a male shaft having a longitudinal bore and counter bore.

13. The drive shaft of claim 12; wherein said gas cylinder is mounted within said counter bore in fixed position.

14. The drive shaft of claim 13; including a threaded connection fixing said gas cylinder within said counter bore.

15. The drive shaft of claim 10; wherein said self aligning coupler connects an end of said cylinder rod with said second end of said drive shaft.

16. The drive shaft of claim 15; wherein said self aligning coupler includes a concave surface and a convex surface in mating contact within a housing, said housing maintaining said concave and convex surfaces in said mating relationship while allowing limited lateral movement.

17. The drive shaft of claim 10; wherein said gas cylinder exerts pressure of between 1325 and 2370N.

18. The drive shaft of claim 10; wherein said drive shaft has an axial movement capability of up to 310 mm.

19. The drive shaft of claim 10; wherein said drive shaft weighs approximately 109 Kg.

* * * * *